United States Patent [19]

Brooks et al.

[11] 4,160,077

[45] Jul. 3, 1979

[54] PROCESS OF CROSSLINKING UNSATURATED HYDROCARBON POLYMERS EMPLOYING NOVEL CARBAMATES

[75] Inventors: John L. Brooks; Richard Budziarek; David J. Harper, all of Manchester, England

[73] Assignee: Imperial Chemical Industries Limited, London, England

[21] Appl. No.: 868,062

[22] Filed: Jan. 6, 1978

Related U.S. Application Data

[63] Continuation of Ser. No. 767,330, Feb. 10, 1977.

[30] Foreign Application Priority Data

Feb. 25, 1976 [GB] United Kingdom ............... 7419/76

[51] Int. Cl.² .................. C08C 19/12; C08C 19/22; C08C 19/28; C08J 3/24
[52] U.S. Cl. .............................. 525/332; 260/768 R; 560/22; 560/25; 560/29; 560/30; 560/31; 560/32; 560/24; 560/137; 560/158; 560/163; 560/157
[58] Field of Search ............ 260/77.5 B, 77.5 BB, 260/768 R, 482 B, 479 C, 471 C; 526/21, 49, 20, 52, 25, 46

[56] References Cited

U.S. PATENT DOCUMENTS

| 3,721,659 | 3/1973 | Cain et al. ........................... 526/21 |
| 3,904,592 | 9/1975 | Sexsmith et al. .................... 526/21 |
| 4,073,800 | 2/1978 | Brooks et al. ....................... 526/20 |

*Primary Examiner*—Herbert J. Lilling
*Attorney, Agent, or Firm*—Cushman, Darby & Cushman

[57] ABSTRACT

A process for the cross-linking or chain extension of hycrocarbon polymers which contain ethylenically unsaturated groups which comprises forming an intimate mixture of the polymer with a carbamate of the formula:

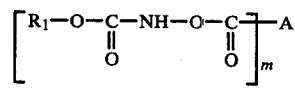

wherein $R_1$ is an optionally substituted hydrocarbyl radical, m is an integer, and A is H or an optionally substituted hydrocarbyl radical of valency m, and subjecting the mixture to heat.

Novel compounds of preferred use include those in which $m=1$ and at least one of R and A is alkyl or 7 or more carbon atoms, or in which $m=2$ and A is phenylene or alkylene or alkenylene of 2 to 4 carbon atoms.

7 Claims, No Drawings

PROCESS OF CROSSLINKING UNSATURATED HYDROCARBON POLYMERS EMPLOYING NOVEL CARBAMATES

This is a continuation of application Ser. No. 767,330 filed Feb. 10, 1977.

This invention relates to a new process and more particularly to a new process for the cross-linking or chain-extension of polymers.

According to the invention there is provided a process for the cross-linking or chain extension of hydrocarbon polymers which contain ethylenically unsaturated groups which comprises forming an intimate mixture of the polymer with a carbamate of the formula:

$$\left[ R_1-O-\underset{\underset{O}{\|}}{C}-NH-O-\underset{\underset{O}{\|}}{C} \right]_m A \quad (1)$$

wherein $R_1$ is an optionally substituted hydrocarbyl radical, m is an integer, and A is H or an optionally substituted hydrocarbyl radical of valency m, and subjecting the mixture to heat.

As examples of hydrocarbyl radicals represented by $R_1$ and by A when m is 1, there may be mentioned alkyl, cyclo alkyl, alkenyl, aralkyl and aryl groups which may be substituted, e.g. by OH or $CO_2H$ but more especially by substituents free from labile hydrogen atoms, e.g.: dialkylamino, $NO_2$, tertiary alkyl, acylamino, etherified hydroxyl, alkyl- or aryl-sulphone, alkyl- or aryl-carbonyl, esterified carboxyl or esterified sulphonic acid groups.

The alkyl or alkenyl groups represented by $R_1$ or A are preferably straight-chain alkyl or alkenyl groups having 1 to 20 carbon atoms, more especially from 7 to 18 carbon atoms and above all from 9 to 11 carbon atoms. As examples of all these, there may be mentioned methyl, ethyl, n and i-propyl, n, i, s- and t-butyl, n-amyl, n-hexyl, n-heptyl, n-octyl, n-nonyl, n-dodecyl, n-octadecyl, vinyl, allyl, n-heptadec-8-enyl, cyclohexyl, benzyl, phenyl, o-, m- and p-tolyl, 2,4- and 2,5-xylenyl. When m has a value of 2, A is preferably a phenylene radical, more preferably p-phenylene, or an alkylene or alkenylene radical of $C_2$ to $C_4$, e.g. ethylene, tetramethylene or fumaroyl.

As particular examples of compounds of formula (1) there may be mentioned:
ethyl N-(benzoyloxy)carbamate
propyl N-(benzoyloxy)carbamate
butyl N-(acetoxy)carbamate
phenyl N-(benzoyloxy)carbamate
phenyl N-(acetoxy)carbamate
2-dimethylaminoethyl N-(acetoxy)carbamate
ethyl N-(2-hydroxybenzoyloxy)carbamate
ethyl N-(2-carboxybenzoyloxy)carbamate
ethyl N-(3-nitrobenzoyloxy)carbamate
ethyl N-(4-chlorobenzoyloxy)carbamate
benzyl N-(acetoxy)carbamate
di-[N-(ethoxycarbonyl)amino]terephthalate
di-[N-(methoxycarbonyl)amino]adipate, and
di-[N-(n-butoxycarbonyl)amino]malonate.

The compounds of formula (1) can be obtained by condensing a chloro-formate ester of formula:

$$R_1-O-CO-Cl \quad (2)$$

with hydroxylamine and reacting the resulting N-hydroxy carbamic ester of formula:

$$R_1-O-\underset{\underset{O}{\|}}{C}-NH-OH \quad (3)$$

with the anhydride or acyl halide of a carboxylic acid of formula $A(CO_2H)_m$.

As examples of polymers which may be cross-linked or chain-extended in accordance with the invention there may be mentioned natural and synthetic polyisoprene and other isoprene-containing copolymers, polybutadiene and butadiene copolymers.

The carbamates of formula (1) may be incorporated into the polymer by blending with the polymer in any conventional manner, for example on a two-roll mill. The polymer is thereafter shaped, for example in a mould, and heated to a temperature above 50° C., and preferably between 100° C. and 250° C., to bring about cross-linking.

The polymer mixtures may also contain other conventional additives; as examples of such additives, there may be mentioned fillers, e.g. silica, carbon black, diatomaceous earths, pigments, antioxidants, curing accelerators and anti-scorch agents.

In particular, the rate or extent of cross-linking can be modified by addition of tertiary amines, or additives of the above kind which contain tertiary amino groups— e.g. tetramethyl-thiourea or zinc diethyl dithiocarbamate.

The amount of carbamate of formula (1) used will normally be from 0.1 part to 10 parts by weight per 100 parts by weight of the polymer; the use of other proportions however is possible.

The invention is illustrated by the following examples in which parts and percentages are by weight.

EXAMPLE 1

One hundred parts of natural rubber latex containing 30% dry rubber content, 0.5% cetyl trimethyl ammonium bromide and 0.3% ammonia, was neutralised to pH 7 with dilute hydrochloric acid. Ethyl-N-(benzoyloxy)carbamate (6.3 parts) was added to the latex and the mixture stirred for 5 minutes. Triethylamine (5.3 parts) was added and the mixture heated to 70° C. with stirring. After 30 minutes the latex gelled, but heating was continued for a further two hours. The resulting rubber was separated from the aqueous liquors and washed free of impurities with hot water and dried under ambient conditions. The yield of rubber was 26 parts.

The rubber had a gel fraction of 0.67 (in toluene) compared with a gel fraction of 0.21 for a rubber derived from a process similar to that above, but omitting the ethyl-N-(benzoyloxy)carbamate.

EXAMPLE 2

Crosslinking of SBR

The masterbatch detailed below was prepared in a conventional manner in an internal mixer.

| | parts by weight |
|---|---|
| Solution polymerised Styrene Butadiene Rubber ("Solprene" 1204) | 100 |

| | parts by weight |
|---|---|
| High Abrasion Furnace Black (N 330) | 50 |

Curatives as detailed in Table I were then added to separate portions of this masterbatch on a two roll mill at 70° C.

Table 1

| Mix No | 1 | 2 | 3 |
|---|---|---|---|
| Zinc oxide | 5 | — | — |
| Stearic acid | 1 | — | — |
| N-cyclohexyl-2-benzthiazylsulphenamide | 1.2 | — | — |
| sulphur | 1.8 | — | — |
| ethyl-N-(benzoyloxy)carbamate | — | 4.0 | 4.0 |
| Zinc diethyl dithiocarbamate | — | — | 4.0 |

The compounded stocks were tested for scorch/cure characteristics using an Oscillating Disc Rheometer. The results are given in Table II.

Table II

| Mix No. | 1 | 2 | 3 |
|---|---|---|---|
| Oscillating Disc Rheometer at 190° C. | | | |
| Peak torque (in lbs) | 104 | 77 | 59 |
| Time (minutes) to 95% crosslinking | 3 | 10 | 7.5 |

A preferred class of compounds for use in the above process are believed to be new, and are represented by formula (1) above, in which m=1, and at least one of $R_1$ and A is alkyl of seven or more carbon atoms. As examples of these, there may be mentioned:

n-heptyl N-(benzoyloxy)carbamate
n-octyl N-(benzoyloxy)carbamate
n-decyl N-(acetoxy)carbamate
ethyl N-(octanoyloxy)carbamate
methyl N-(dodecanoyloxy)carbamate
phenyl N-(octoyloxy)carbamate
phenyl N-(stearyloxy)carbamate
octadecyl N-(benzoyloxy)carbamate
oleyl N-(2-ethoxycarbonylbenzoyloxy)carbamate
octyl N-(3-nitrobenzoyloxy)carbamate
decyl N-(4-chlorobenzoyloxy)carbamate
benzyl N-(oleyloxy)carbamate These compounds can be obtained by the process described above for manufacture of compounds of formula (1) with the proviso that at least one of A and $R_1$ is alkyl of $C_7$ or greater.

As examples of chloroformate esters of formula (2) there may be mentioned:
methyl, ethyl, n- and i-propyl, butyl, octyl, nonyl, dodecyl and octadecyl chloroformates,
benzyl chloroformate,
allyl chloroformate,
phenyl chloroformate,
cyclohexyl chloroformate.

As examples of monobasic carboxylic acids of formula A.CO$_2$H there may be mentioned:
acetic, propionic, butyric, hexoic, octanoic, 2-methyl-hexanoic,
decenoic, undecenoic, dodecenoic, stearic and oleic acids,
cyclohexane carboxylic acid
benzoic acid
phenylacetic acid
o-, m- and p-chlorobenzoic acids
o-, m- and p-nitrobenzoic acids.

As compared with known compounds of formula (1), but containing a lower alkyl ester in place of that of $C_7$ or higher, the new compounds are advantageous in that they are less volatile and blend more easily and more quickly with polymers. In some cases the new compounds give a higher degree of cross-linking than the known compounds.

A further class of new compounds of formula (1) are those wheren m=2 and CO.A.CO is the diacyl radical of a carboxylic acid, e.g. of
phthalic, iso-phthalic and terephthalic acids,
oxalic acid
malonic acid
succinic acid
glutonic acid
adipic acid.

As particular examples of such compounds, there may be mentioned
di-[N-(ethoxycarbonyl)amino]terephthalate
di-[N-(methoxycarbonyl)amino]adipate, and
di-[N-(n-butoxycarbonyl)amino]malonate.

These compounds can be obtained by reacting a N-hydroxycarbamic ester of formula (3) with the anhydride, lower alkyl, e.g. methyl or ethyl, ester or acyl halide of a polybasic carboxylic acid of formula A.(CO$_2$H)$_2$.

The new compounds described above, and their manufacture form further features of the invention. They are illustrated by the following Examples in which parts and percentages are by weight.

EXAMPLE 3

A solution of 276.4 parts of potassium carbonate in 300 parts of water and 217 parts of ethylchloroformate are added over 1.5 hours at equivalent rates to 139 parts of ground hydroxylammonium chloride, stirred in 1000 parts of diethyl ether at 0°–5° C. The reaction mixture is stirred a further 12 hours at 20°–25° C. and then filtered to remove potassium chloride. The ether layer is separated, washed with 25 parts of water, dried and filtered. The filtrate is evaporated to constant weight at 30° C. under reduced pressure to give 154 parts of ethoxy N-hydroxycarbonate as a colourless oil.

| Analysis: Found | C, 34.1; | H, 6.8; | N, 13.2%. |
|---|---|---|---|
| C$_3$H$_7$NO$_3$ requires | C, 34.2; | H, 6.7; | N, 13.3% |

31 Parts of ethyl N-hydroxycarbonate are added to 30.4 parts of ground terephthaloylchloride stirred in 100 parts of dioxan at 5°–10° C. followed by 30.3 parts of triethylamine added over 1 hour at 0°–5° C. The reaction mixture is stirred for a further 3 hours at 5°–10° C. followed by 24 hours at 20°–25° C. and is then added to 1000 parts water to give a white solid. The solid is filtered off, washed and dried to give 42 parts of di-[N-(ethoxycarbonyl)amino]terephthalate as a white solid, m.p. 130° C.

| Analysis: Found | C, 50.2; | H, 4.3; | N, 7.3% |
|---|---|---|---|
| C$_{14}$H$_{16}$N$_2$O$_8$ requires | C, 49.5; | H, 4.7; | N, 8.2% |

EXAMPLE 4

36.6 Parts of adipoyl chloride are added to 42 parts of ethyl N-hydroxycarbonate stirred in 500 parts of ether at 0°–5° C. and then 40.4 parts of triethylamine are added over 1 hour at 0°-5° C. The reaction mixture is stirred a further 2 hours at 5°-10° C. followed by 18 hours at 20°-25° C. and is then filtered to remove triethylammonium chloride. The ether layer is separated, washed with 50 parts water, dried, filtered and the filtrate evaporated to constant weight at 30° C. under reduced pressure to give 52 parts of di-[N-(ethoxycarbonyl)amino]adipate as a white solid, m.p. 60° C.

| Analysis: Found: | C, 44.6; | H, 6.5; | N, 8.8%. |
|---|---|---|---|
| $C_{12}H_{20}N_2O_8$ requires | C, 45.0; | H, 6.3; | N, 8.7%. |

EXAMPLE 5

42 parts of ethyl N-hydroxy carbamate prepared by the method described in Example 3 are stirred in 300 parts of diethylether maintained at 0°-5° C. and 30.4 parts of fumaroyl chloride are added. 40.4 parts of triethylamine are added during 2 hours and the mixture is stirred for a further 3 hours at 5° to 10° C. followed by 18 hours at 25° C. The mixture is then filtered and the filtrates washed twice with 100 parts water, dried, filtered and evaporated to constant weight at 40° C. under reduced pressure to give 37 parts of di-[N-(ethoxycarbonyl)amino]fumarate as a white powder m.p. 120° C.

| Analysis: Found: | C 41.7; | H 5.1; | N 9.7%. |
|---|---|---|---|
| $C_{10}H_{14}N_2O_8$ requires: | C 41.5; | H 4.8; | N 10.0%. |

EXAMPLE 6

A solution of 270 parts of n-octadecanol in 150 parts of chloroform is added during 90 mins to a stirred solution of 300 parts of phosgene in 450 parts of methylene dichloride at 0°-5° C. The reaction mixture is then stirred a further 2 hours at 0°-5° C., 2 hours at 10° C. and 12 hours at 25° C. Excess phosgene and hydrogen chloride are removed by passing a stream of dry nitrogen. The residue is evaporated to constant weight at 100° C. under reduced pressure to give 327 parts of n-octadecyl chloroformate as a pale yellow oil.

| Analysis: Found: | C 68.3%, | H 11.4%, | Cl 10.7%. |
|---|---|---|---|
| $C_{19}H_{37}O_2Cl$ requires: | C 68.6%, | H 11.1%, | Cl 10.7%. |

A solution of 27.7 parts of potassium carbonate in 40 parts of water and 66.5 parts of n-octadecyl chloroformate are added over 2 hours at equivalent rates to 13.9 parts of ground hydroxy ammonium chloride, stirred in 1000 parts of diethyl ether at 0° to 5° C. The reaction mixture is stirred for a further 12 hours at 20°-25° C. and the ether layer is separated, washed with 100 parts of water, dried and filtered. The filtrate is evaporated to constant weight at 30° C. under reduced pressure to give 63 parts of octadecyl-N-hydroxy carbamate as a white solid m.p. 63° C.

| Analysis: Found: | C 70.7%, | H 13.1%, | N 4.1%. |
|---|---|---|---|
| $C_{19}H_{39}O_3N$ requires: | C 69.4%, | H 11.8%, | N 4.3%. |

A solution of 7.5 parts of triethylamine in 25 parts of dioxan is added over 2 hours to a stirred suspension of 13.5 parts of p-nitrobenzoyl chloride and 24.2 parts of octadecyl-N-hydroxycarbamate in 125 parts of dioxan at 5° C. keeping the pH in the range pH3 to pH5. The temperature is raised to 25° C. and the mixture is stirred for a further 24 hours and then added to 1000 parts of water to give a waxy solid. The solid is dissolved in 250 parts of chloroform and the solution is washed with 200 parts of water, dried, filtered and is evaporated to constant weight at 40° C. under reduced pressure to give 31.5 parts of n-octadecyl-N-(p-nitrobenzoyloxy)carbamate as a waxy solid m.p. 84° C.

| Analysis: Found: | C 64.8% | H 9.0%, | N 5.3%. |
|---|---|---|---|
| $C_{26}H_{42}O_6N_2$ requires: | C 65.4%, | H 8.8%, | N 5.9%. |

EXAMPLE 7

33.7 Parts of triethylamine is added over 90 mins. to a stirred mixture of 35 parts of ethyl-N-hydroxy carbamate and 54.2 parts of octanoyl chloride in 150 parts of dioxan at 0°-5° C., keeping the pH in the range pH3 to pH5. The mixture is heated to 25° C. and the reaction mixture stirred for a further 18 hours and is then added to 1000 parts of water to give a yellow oil. The oil is dissolved in 200 parts of 60°-80° petrol ether and the solution is washed with water, dried, filtered and evaporated to constant weight at 40° C. under reduced pressure to give 68 parts of ethyl-N-octanoyloxy carbamate as a pale yellow oil.

| Analysis: Found | C 60.8% | H 10.0% | N 5.0% |
|---|---|---|---|
| $C_{11}H_{21}NO_4$ requires: | C 57.2%, | H 9.1%, | N 6.6%. |

EXAMPLE 8

288 Parts of nonanol are reacted with phosgene in a similar way to the method described in Example 6 to give 342 parts of nonyl chloroformate as a colourless liquid b.p. 70° C. at 1 mm pressure.

A solution of 112 parts of potassium hydroxide in 1000 parts of water and 206.5 parts of nonyl chloroformate were added at equivalent rates over 2 hours to a stirred suspension of 69.5 parts of ground hydroxyl ammonium chloride in 1000 parts of ether at 0° C. to 5° C. The reaction mixture was stirred for a further 3 hours at 0°-5° C. followed by 18 hours at 25° C. and was then filtered to remove potassium chloride. The ether layer was separated, washed with water, dried, filtered and evaporated to constant weight at 40° C. under reduced pressure to give 190 parts of nonyl-N-hydroxycarbamate as a colourless oil.

| Analysis: Found: | C 58.8% | H 10.3% | N 6.8% |
|---|---|---|---|
| $C_{10}H_{21}NO_3$ requires: | C 59.2% | H 9.9% | N 6.9% |

25 Parts of triethylamine were added dropwise over 2 hours to a stirred solution of 35.1 parts of benzoyl chloride and 50.6 parts of nonyl-N-hydroxycarbamate in 500 parts of ether at 0°-5° C. keeping the pH in the range pH3 to pH5. The reaction mixture is stirred a further 2 hours at 0°-5° C. then for 18 hours at 25° C. and was then filtered to remove amine hydrochloride. The filtrates were washed with water, dried, filtered and evaporated to constant weight at 30° C. under reduced pressure to give 60 parts of nonyl-N-(benzoyloxy) carbamate as a colourless oil.

| Analysis: Found: | C 65.9%, | H 8.8%, | N 4.4%. |
|---|---|---|---|
| $C_{17}H_{25}NO_4$ requires: | C 66.5%, | H 8.2%, | N 4.6%. |

EXAMPLE 9

25 Parts of triethylamine are added over 30 minutes to a stirred solution of 19.6 parts of acetyl chloride and 50.6 parts of nonyl-N-hydroxycarbamate in 500 parts of ether at 0°–5° C. keeping the pH of the mixture in the range pH3 to pH6. The reaction is stirred for a further 2 hours at 0°–5° C. followed by 24 hours at 25° C. and is then filtered to remove amine hydrochloride. The filtrates are washed with water, dried, filtered and evaporated to constant weight at 30° C. under reduced pressure to give 61 parts of nonyl-N-(acetoxy)carbamate as a pale yellow oil.

| Analysis: Found: | C 58.3%, | H 9.4%, | N 5.2%. |
|---|---|---|---|
| $C_{12}H_{23}NO_4$ requires: | C 58.8%, | H 9.4%, | N 5.7%. |

EXAMPLE 10

30.4 parts of phenyl N-hydroxycarbamate and 43.7 parts of lauroyl chloride are stirred in 100 parts of methylene dichloride at 0°–5° C. and 20.4 parts of triethylamine are added during 1 hour, the pH remaining at 3 to 6.

The mixture is then warmed to 25° C., stirred for 18 hours and filtered. The filtrates are washed with 100 parts of water, dried, filtered and evaporated to constant weight at 45° C. under reduced pressure to give 57 parts of phenyl N(lauroyloxy)carbamate as a brown oil.

| Analysis: Found: | C 68.0%, | H 8.7%, | N 4.2%. |
|---|---|---|---|
| $C_{19}H_{29}NO_4$ requires: | C 71.3%, | H 5.1%, | N 4.2%. |

EXAMPLE 11

A repeat of Example 10, using 40.6 parts of nonyl N-hydroxy carbamate in place of the phenyl N-hydroxycarbamate gives 62 parts of nonyl N(dodecanoyloxy)-carbamate as a waxy solid.

| Analysis: Found: | C 68.5%, | H 11.1%, | N 3.6%. |
|---|---|---|---|
| $C_{22}H_{43}NO_4$ requires: | C 68.8%, | H 11.9%, | N 4.3%. |

EXAMPLE 12

A repeat of Example 11 using 60.6 parts of stearoyl chloride instead of lauryl chloride gives 78 parts of nonyl N(octadecanoyloxy) carbamate as a light brown liquid.

| Analysis: Found: | C 71.2%, | H 11.8%, | N 3.4%. |
|---|---|---|---|
| $C_{28}H_{55}NO_4$ requires | C 71.6%, | H 11.7%, | N 3.0%. |

EXAMPLE 13

A repeat of Example 10 using 21 parts of ethyl N-hydroxy carbamate and 60.6 parts of stearoyl chloride gives 54 parts of ethyl N-(octadecanoyl)carbamate as a waxy solid m.p. 44° C.

| Analysis: Found: | C 68.0%, | H 11.2%, | N 3.4%. |
|---|---|---|---|
| $C_{21}H_{41}NO_4$ requires: | C 67.9%, | H 11.1%, | N 3.7%. |

EXAMPLE 14

A repeat of Example 10 using 21 parts of ethyl-N-hydroxy carbamate instead of the phenyl-N-hydroxycarbamate gives 48 parts of ethyl N(dodecanoyloxy)-carbamate as a colourless oil.

| Analysis: Found: | N 4.6%. |
|---|---|
| $C_{15}H_{29}NO_4$ requires: | N 4.9%. |

EXAMPLE 15

170.5 parts of benzyl chloroformate are reacted with 69.5 parts of ground hydroxylamine hydrochloride in a similar manner to Example 8 to give 149 parts of benzyl-N-hydroxycarbamate as a waxy solid.

12.7 parts of this product and 21.9 parts of lauroyl chloride are reacted together in a similar manner to Example 11 to give 32 parts of benzyl N-(dodecanoyloxy)carbamate as a waxy solid m.p. 40° to 42° C.

| Analysis: Found: | C 65.9%, | H 8.9%, | N 3.3%. |
|---|---|---|---|
| $C_{20}H_{31}NO_4$ requires: | C 68.6%, | H 8.6%, | N 3.9%. |

The following Table gives the peak torque (in lb.) and time (in minutes) to 95% cross linking when 4 parts of the indicated acyloxy carbamate is used in place of the ethyl N-(benzoyloxy)carbamate in Example 2, and in some instances, where 4 parts of zinc diethyldithiocarbamate (ZDC) are also added.

| Example | Acyloxycarbamate | Peak Torque (lb.) | Time to 95% cross-linking (mins.) |
|---|---|---|---|
| 16 | ethyl N-(dodecanoyloxy)carbamate | 103 | 17 |
| 17 | ethyl N-(octadecanoyloxy)carbamate | 92 | 20 |
| 18 | ethyl N-(acetoxy)carbamate | 108 | 7 |
| 19 | ethyl N-(acetoxy)carbamate + ZDC | 45 | 7.5 |
| 20 | ethyl N-(p-nitrobenzoloxy)carbamate | 26 | 3 |
| 21 | ethyl N-(p-nitrobenzoyloxy)carbamate + ZDC | 75 | 3 |
| 22 | n-butyl-N-(benzoyloxy)carbamate | 124 | 20 |
| 23 | n-nonyl-N-(acetoxy)carbamate | 133 | 16 |
| 24 | n-nonyl-N-(acetoxy)carbamate + ZDC | 44 | 42 |
| 25 | n-nonyl-N-(dodecanoyloxy)carbamate | 114 | 35 |
| 26 | n-nonyl-N-(octadecanoyloxy)carbamate | 86 | 30 |
| 27 | n-nonyl-N-(benzoyloxy)carbamate | 120 | 14 |
| 28 | n-nonyl-N-(benzoyloxy)carbamate + ZDC | 50 | 4 |

-continued

| Example | Acyloxycarbamate | Peak Torque (lb.) | Time to 95% cross-linking (mins.) |
|---|---|---|---|
| 29 | phenyl N-(undecanoyloxy)carbamate | 54 | 39 |
| 30 | phenyl N-(benzoyloxy)carbamate | 95 | 9 |
| 31 | benzyl N-(dodecanoyloxy)carbamate | 73 | 45 |
| 32 | benzyl N-(benzoyloxy)carbamate | 74 | 50 |
| 33 | di-(N-ethoxycarbonylamino)terephthalate | 118 | 14.5 |
| 34 | di-(N-ethoxycarbonylamino)terephthalate + ZDC | 68 | 10.4 |
| 35 | di-(N-ethoxycarbonylamino)adipate | 78 | 25 |
| 36 | di-(N-ethoxycarbonylamino)adipate + ZDC | 39 | 24 |
| 37 | di-(N-ethoxycarbonylamino)fumarate | 67 | 25 |
| 38 | di-(N-ethoxycarbonylamino)fumarate + ZDC | 26 | 17 |

The ethyl-N-(acetoxy)carbamate used was a pale yellow liquid obtained by reacting ethyl-N-hydroxycarbamate with acetyl chloride.

| Analysis: Found: | C 39.9%, | H 6.7%, | N 9.1%. |
|---|---|---|---|
| $C_5H_9NO_4$ requires: | C 40.9%, | H 6.1%, | N 9.5%. |

The ethyl-N-(benzoyloxy)carbamate used was a colourless oil obtained by reacting ethyl-N-hydroxycarbamate with benzoyl chloride.

The ethyl-N-(p-nitrobenzoyloxy)carbamate used was a light brown solid, m.p. 88° C. obtained by reacting ethyl-N-hydroxycarbamate with p-nitrobenzoyl chloride.

| Analysis: Found: | C 47.9%, | H 3.9%, | N 11.0%. |
|---|---|---|---|
| $C_{10}H_{10}N_2O_6$ requires: | C 47.3%, | H 3.9%, | N 11.0%. |

The n-butyl-N-(benzoyloxy)carbamate used was a pale yellow liquid obtained by reacting n-butyl-N-hydroxycarbamate with benzoyl chloride.

| Analysis: Found: | C 60.4%, | H 6.4%, | N 6.4%. |
|---|---|---|---|
| $C_{12}H_{15}NO_4$ requires: | C 60.7%, | H 6.3%, | N 5.9%. |

The phenyl-N-(benzoyloxy)carbamate used was a white solid, m.p. 83° C. obtained by reacting phenyl-N-hydroxycarbamate with benzoyl chloride.

| Analysis: Found: | C 64.6%, | H 3.9%, | N 5.1%. |
|---|---|---|---|
| $C_{14}H_{11}NO_4$ requires: | C 65.4%, | H 4.3%, | N 5.5%. |

The benzyl-N-(benzoyloxy)carbamate used was a white solid, m.p. 82°-4° C. obtained by reacting benzyl-N-hydroxycarbamate with benzoyl chloride.

| Analysis: Found: | C 66.4%, | H 4.7%, | N 5.2%. |
|---|---|---|---|
| $C_{15}H_{13}NO_4$ requires: | C 66.4%, | H 4.8%, | N 5.2%. |

What we claim is:

1. A process for the cross-linking of hydrocarbon polymers which contain ethylenically unsaturated groups which comprises forming an intimate mixture of the polymer with a carbamate of the formula:

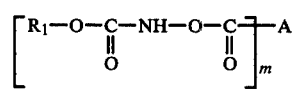

wherein $R_1$ is an alkyl or alkenyl group of 1 to 20 carbon atoms, benzyl or phenyl, m is 1 or 2, when m is 1, A is H, an alkyl or alkenyl group of 1 to 20 carbon atoms, phenyl, hydroxyphenyl, carboxyphenyl, nitrophenyl or chlorophenyl and when m is 2, A is phenylene or an alkylene or alkenylene radical of 2 to 4 carbon atoms.

2. A process as claimed in claim 1 wherein the mixture is heated to a temperature of 100°-250° C.

3. A process as claimed in claim 1, wherein the carbamate has m=1, and at least one of $R_1$ and A is an alkyl group of 7 or more carbon atoms.

4. A process as claimed in claim 3 wherein the alkyl is a straight-chain alkyl group of 7 to 18 carbon atoms.

5. A process as claimed in claim 4 wherein the alkyl group contains 9 to 11 carbon atoms.

6. A process as claimed in claim 1, wherein the carbamate has m=2 and A is an optionally substituted hydrocarbyl radical of valency 2.

7. A process as claimed in claim 6 wherein A is phenylene or alkylene or alkenylene of 2 to 4 carbon atoms.

* * * * *